United States Patent
Mantell et al.

(10) Patent No.: US 10,457,034 B2
(45) Date of Patent: Oct. 29, 2019

(54) SYSTEM AND METHOD FOR DECREASING TIME FOR PRINTING LAYERS IN THREE-DIMENSIONAL OBJECTS AND FOR ENHANCING COLOR FIDELITY AT THE SURFACE OF THREE-DIMENSIONAL OBJECTS

(71) Applicant: Xerox Corporation, Norwalk, CT (US)

(72) Inventors: David A. Mantell, Rochester, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 15/434,689

(22) Filed: Feb. 16, 2017

(65) Prior Publication Data

US 2018/0229447 A1 Aug. 16, 2018

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *H04N 1/60* | (2006.01) |

(Continued)

(52) U.S. Cl.
CPC ............ *B33Y 10/00* (2014.12); *B29C 64/112* (2017.08); *B29C 64/386* (2017.08); *B29C 64/393* (2017.08); *B33Y 30/00* (2014.12); *B33Y 50/02* (2014.12); *H04N 1/60* (2013.01); *B29K 2105/0058* (2013.01); *B29K 2995/002* (2013.01)

(58) Field of Classification Search
None
See application file for complete search history.

(56) References Cited

U.S. PATENT DOCUMENTS

| | | |
|---|---|---|
| 6,165,406 A | 12/2000 | Jang et al. |
| 6,188,415 B1 * | 2/2001 | Silverbrook ......... B41J 2/17513 347/20 |

(Continued)

FOREIGN PATENT DOCUMENTS

WO   2015/178443 A1   11/2015

OTHER PUBLICATIONS

European Patent Office; European Search Report corresponding to European Application No. 18153534.5; dated Jun. 18, 2018; 10 Pages.

*Primary Examiner* — Joseph A Miller, Jr.
(74) *Attorney, Agent, or Firm* — Maginot Moore & Beck LLP (57) ABSTRACT

A three-dimensional object printer has a controller that operates pluralities of ejectors ejecting drops of different materials having different colors, at least one color of which is white, to produce objects with different levels of color saturation. The controller operates the pluralities of ejectors with reference to a function of a sum of an average number of drops per voxel in each layer, a target value of an average number of drops per voxel of colorants other than white in each layer, and a distance from a closest surface of the object for each material ejected by the ejectors. At a predetermined distance from a closest surface and greater, the controller operates the pluralities of ejectors to form voxels in layers of the object with only clear and white drops. At distances less than the predetermined distance, the number of clear drops increases and the number of white drops decreases.

14 Claims, 7 Drawing Sheets

(51) Int. Cl.
*B29C 64/393* (2017.01)
*B29C 64/112* (2017.01)
*B29C 64/386* (2017.01)
*B29K 105/00* (2006.01)

(56) References Cited

U.S. PATENT DOCUMENTS

| | | |
|---|---|---|
| 7,991,498 B2 | 8/2011 | Kritchman |
| 8,827,684 B1 | 9/2014 | Schumacher et al. |
| 2004/0080078 A1 | 4/2004 | Collins |
| 2004/0141025 A1* | 7/2004 | Silverbrook ............ B22F 3/008 |
| | | 347/40 |
| 2013/0095302 A1 | 4/2013 | Pettis et al. |
| 2013/0230213 A1* | 9/2013 | Maladen ............... G06T 7/0004 |
| | | 382/106 |
| 2015/0002567 A1 | 1/2015 | Miller |
| 2016/0151980 A1 | 6/2016 | Hatanaka |

* cited by examiner

SYSTEM AND METHOD FOR DECREASING TIME FOR PRINTING LAYERS IN THREE-DIMENSIONAL OBJECTS AND FOR ENHANCING COLOR FIDELITY AT THE SURFACE OF THREE-DIMENSIONAL OBJECTS

TECHNICAL FIELD

This disclosure relates generally to three-dimensional (3D) object printing, and, in particular, to reducing the time required to print three-dimensional objects and to producing colors more accurately at the surfaces of printed three-dimensional objects.

BACKGROUND

In 3D object printing, objects are built one layer at a time. The one or more printheads ejecting the drops are moved over the object multiple times. The number of passes required to produce an object can result in extremely long times for production of a typical object. Some objects are so large that several days may be required to form the object. In addition to the materials ejected by a 3D printing system that form the structure of an object, some printing systems also include pigmented materials of overlaying images on the surface of a produced part. In these systems, the object structure is typically formed with clear and white build materials and colored materials, such as the colors commonly used in two-dimensional printing, namely, cyan, magenta, yellow and black (C, M, Y, and K), are used to form the images. As used in this document, "colored material" or "pigmented material" refers to materials having a hue in the light spectrum range from red to violet and black. Each layer is made of only one type of the material, that is, either build material or pigmented material. One way to reduce the time required to form an object is to print multiple layers in a single pass. In order to achieve this goal, the number of ejectors assigned to each material must also be increased. Of course, this increase in the number of ejectors also increases the cost of the system since it is a hardware expense. Therefore, a direct relationship between speed and cost exists in the 3D object printing systems.

Issues also arise with the printing of images with pigmented materials because printing color on the surface of 3D objects is not the same as applying paint to a surface. Paint has colorant concentrations that are far greater than those that can be incorporated into materials that can be ejected by printheads. In printing colors, white material may be used as a base for an image and then the image is formed with various color combinations. Thick layers of colors, however, cannot form high resolution images. Additionally, many 3D object printing systems include a leveling device that is used from time to time in the manufacturing process to remove some material to level the surface. This leveling is required because the addition of other layers on top of an unlevel surface can disrupt the configuration of the object being manufactured. The amount of material removed can also produce unacceptable variations in color. A 3D object printing surface that reduces the manufacturing time and that reliably reproduces colors at the surface of the objects would be beneficial.

SUMMARY

A new 3D object printing system is configured to reduce object manufacturing times and to enable more accurate reproduction of colors on the surface of the objects. The system includes a first plurality of ejectors configured to eject drops of a first material having a first color, a second plurality of ejectors configured to eject drops of a second material having a second color, the first color being different than the second color, a third plurality of ejectors configured to eject drops of a third material having a third color, the third color being different than the second color and the first color, at least one actuator operatively connected to the first plurality of ejectors, the second plurality of ejectors, and the third plurality of ejectors, and a controller operatively connected to the at least one actuator, the first plurality of ejectors, the second plurality of ejectors, and the third plurality of ejectors. The controller is configured to identify an average number of material drops per voxel for each material in each layer of an object to be manufactured, convert image data for the object to material drop data for each of the first material, the second material, and the third material with reference to a first function of a sum of the average number of second material drops per voxel of each layer and the average number of third material drops per voxel in each layer, a target value for the sum of the average number of material drops per voxel of all materials, and a distance between the layer and a closest surface of the object, converting the material drop data to drop data that identifies material drops for each voxel in each layer, and operating with reference to the converted material drop data the first plurality of ejectors, the second plurality of ejectors, and the third plurality of ejectors to eject drops of the first material, drops of the second material, and drops of the third material to form the layers of the object corresponding to the image data.

A method of operating a new 3D printing system reduces object manufacturing times and enables more accurate reproduction of colors on the surface of the objects. The method includes identifying with a controller an average number of material drops per voxel for each material in each layer of an object to be manufactured, converting with the controller image data for the object to material drop data for each of a first material, a second material, and a third material with reference to a first function of a sum of the identified average number of second material drops per voxel of each layer and the identified average number of third material drops per voxel in each layer, a target value for the sum of the identified average number of material drops per voxel of all materials, and a distance between the layer and a closest surface of the object, converting with the controller the material drop data to drop data that identifies material drops for each voxel in each layer, and operating a first plurality of ejectors, a second plurality of ejectors, and a third plurality of ejectors with the controller with reference to the converted material drop data to eject drops of the first material, drops of the second material, and drops of the third material to form the layers of the object corresponding to the image data, each plurality of ejectors ejecting material drops have a color different than a color of the material drops ejected by the other pluralities of ejectors.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
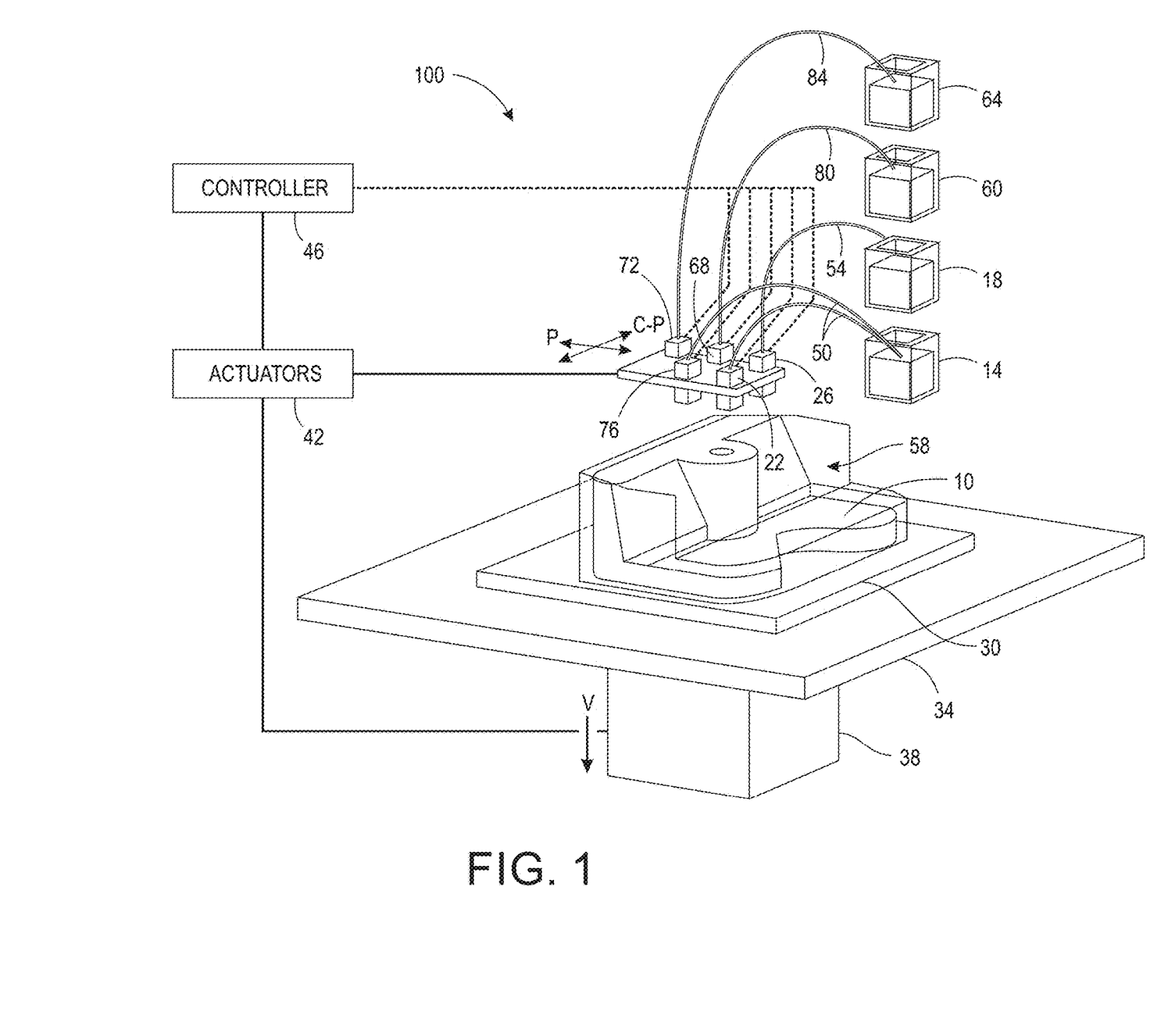
FIG. 1 is an illustration of a 3D printing system configured to increase layer formation in a single pass over previously known systems.

FIG. 1 shows a configuration of components in a printing system 100, which produces a three-dimensional object or part 10. As used in this document, the term "three-dimensional printer" refers to any device that ejects drops of material with reference to image data of an object to form a three-dimensional object. The printing system 100 includes a support material reservoir 14, a pigmented building material reservoir 18, a clear building material reservoir 60, a white building material reservoir 64, a plurality of ejectors 22, 26, 68, 72, and 76, a build substrate 30, a planar support member 34, a columnar support member 38, an actuator 42, and a controller 46. Conduits 50 connect ejectors 22 and 76 to support material reservoir 14 and conduit 54 connects ejector 26 to pigmented building material reservoir 18. Conduits 80 and 84 connect ejectors 68 and 72, respectively, to clear building material reservoir 60 and to white building material reservoir 64, respectively. The ejectors are operated by the controller 46 with reference to three-dimensional image data in a memory operatively connected to the controller to eject drops of the support and building materials supplied to each respective ejector. Each datum stored in a single location in the three-dimensional image data is defined as a "voxel" in this document. The building material forms the structure of the part 10 being produced, while the support structure 58 formed by the support material drops enables the building material drops to maintain their shape while the material drops solidify as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the ejectors 22, 26, 68, 72, 76 relative to one another. That is, one or more actuators can be operatively connected to structure supporting the ejectors to move the ejectors in a process direction P and a cross-process C-P direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The ejectors 22, 26, 68, 72, 76 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the ejectors or by one or more actuators operatively connected to both the columnar support member 38 and the ejectors. These actuators in these various configurations are operatively connected to the controller 46, which operates the actuators to move the columnar member 38, the ejectors, or all of these components in the vertical direction.

Figure 3:
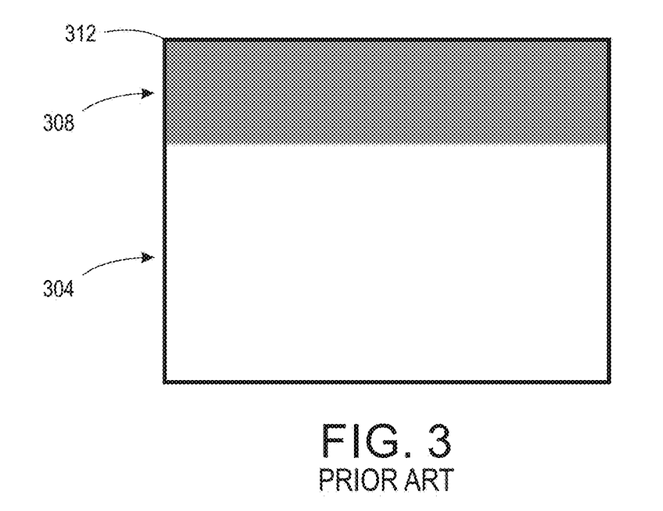
FIG. 3 depicts the formation of color at the surface of an object formed by a prior art 3D printer.
Figure 4:
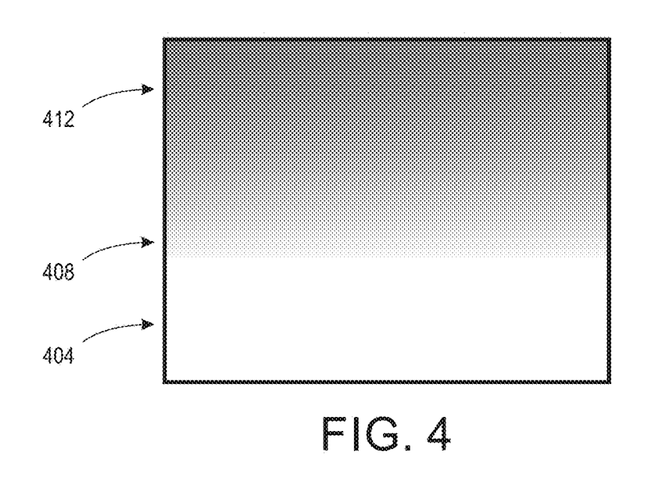
FIG. 4 illustrates the formation of color at the surface of an object formed by the 3D printer of FIG. 1.
Figure 5A:
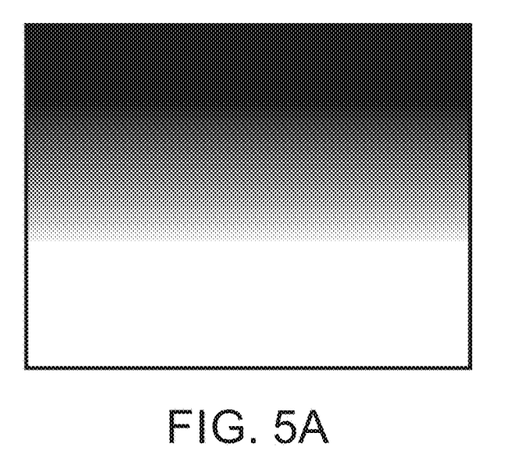
FIGS. 5A and 5B illustrate the formation of a dark surface and a gray surface, respectively, of an object formed by the 3D printer of FIG. 1.
Figure 5B:
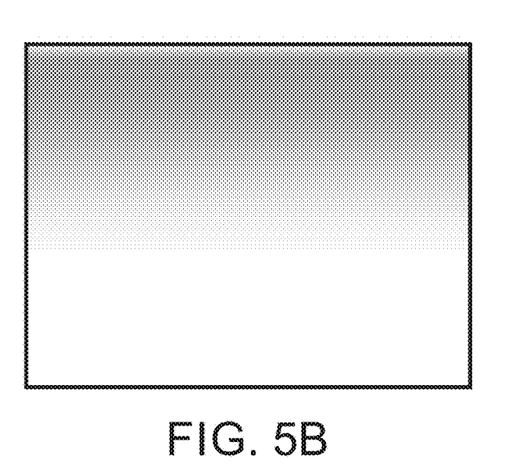
Figure 6A:
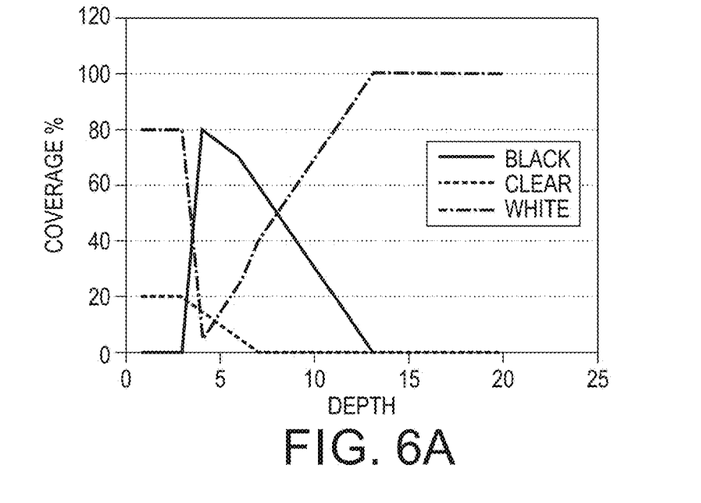
FIGS. 6A and 6B are graphical representations of a portion of a color rendering strategy for producing a less saturated color and a more saturated color, respectively.
Figure 6B:
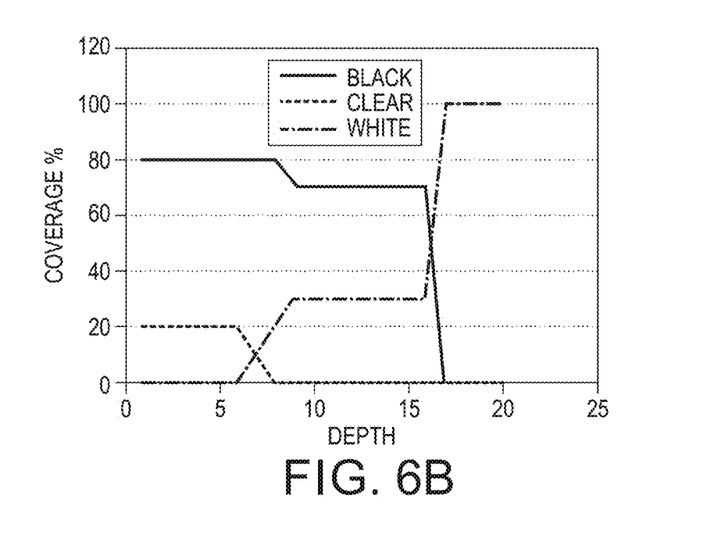

In previously known 3D printing systems, layers of pigmented material are printed near the surface and sometimes covered with clear material layers, while the lower layers consist of white material to provide a background for the colored and clear material. An example of this structure is presented in FIG. 3. As shown in the figure, the interior layers 304 are formed with drops of white material alone. The next layers 308 are formed with pigmented material alone and then can be covered with one or more layers 312 of clear material, if desired, to protect the pigmented material. With the printer shown in FIG. 1, the pigmented material drops are introduced in increasing proportions in the next layers 408 to provide a more gradated color scheme as shown in FIG. 4. For the layers 412 closest to the surface of the part, the drops of pigmented material dominate the layers although drops of clear material, and even some drops of white material, are included in the layers. The method of increasing altering the proportions of the pigmented, clear, and white materials enables the preservation of the gamut of the pigmented color by increasing the size of the color managed planes. That is, the depth of the color managed volume near the surface is larger as demonstrated by the increased depth of the layers 408 and 412 as compared to the layers 308 and 412. When the pigmented color is black, a gradated dark or gray color surface can be formed as shown in FIGS. 5A and 5B, respectively. An example of a portion of a strategy for achieving a gradated dark or gray color surface as depicted in FIG. 5B is shown in FIG. 6A. At a predetermined distance from the surface, no black material is ejected, 80% of the material in the voxels are white, and 20% of the material in the voxels are clear. As the layers closer to the surface are formed, the white material falls to a small percentage of the material in the voxels, black material rises to 80% of the material in the voxels, and the clear material in the voxels falls to zero. As the distance to the surface decreases, the percentage of the black material in the voxels decreases to zero while the white material increases to 100 percent. A portion of a strategy for achieving a more saturated color is shown in FIG. 6B. At a predetermined distance from the surface, 80 percent of the material in the voxels is black and 20 percent of the materials in the voxels is clear, while no white material is ejected. As the layers approach the surface, white material is ejected into voxels as clear material ejected into the voxels is decreased until it becomes zero. At that distance, the black material decreases to be 70 percent of the material in the voxels, while the white material in the voxels increases to 30 percent. These percentages continue for subsequent layers until another predetermined distance from the surface is reached at which the percentage of black material in the voxels decreases linearly to zero, while the percentage of white material increases linearly to 100 percent.

Colors formed by a strategy or color model of combining pigmented material with clear material and white material as a function of depth with reference to the surface improves the rendering of the colors at the surface. This strategy provides a white backing for the surface colors in much the same way a piece of paper provides a white background for printed colors. The white and clear materials provide options, particularly with reference to the depth of layer, to deliver a comprehensive 3D color strategy or color model that can be configured as data tables and used by a controller for rendering colors in objects produced by 3D printing systems. As used in this document, "color model" refers to a plurality of functions, one for each material being ejected by a printer, that distribute the materials being ejected as a function of depth with reference to a surface of an object being produced with the materials.

Figure 7:
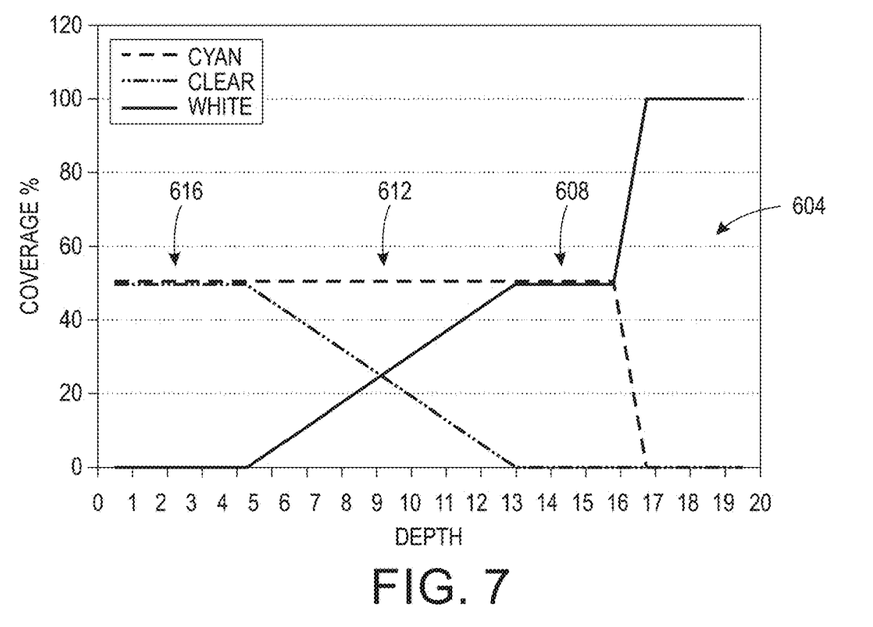
FIG. 7 is a graphical representation of a color rendering strategy that can be performed by the 3D printer of FIG. 1.

One example of a portion of such a strategy is one in which clear material is predominantly used for voxels not filled with color near the surface and linearly increasing amounts of white material are added to layers further removed from the surface. Such a strategy is depicted graphically in FIG. 7. In the interior of the object, only white material is used to formed the layers in the region 604 of the graph. At some predetermined distance from the surface in region 608, layers are formed with 50% pigmented material and 50% white material. In a transition region 612, the pigmented material continues to form 50% of the layers, while the white material decreases linearly from 50% to 0% and the clear material increase linearly from 0% to 50%. Near the surface in region 616, the layers are formed with 50% pigmented material and 50% clear material. Under this scheme, a color formed with 100% of a pigmented material, such as a cyan material, or one formed with a combination of pigmented materials, such as 50% cyan and 50% magenta, does not require additional clear or white materials for a proper rendering.

Figure 8:
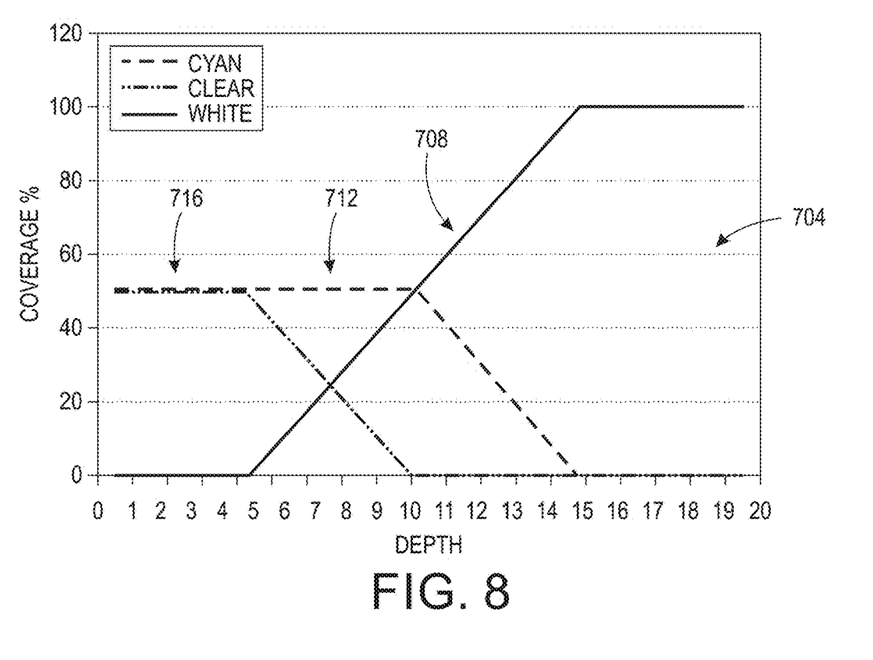
FIG. 8 is a graphical representation of another color rendering strategy that can be performed by the 3D printer of FIG. 1.
Figure 9:
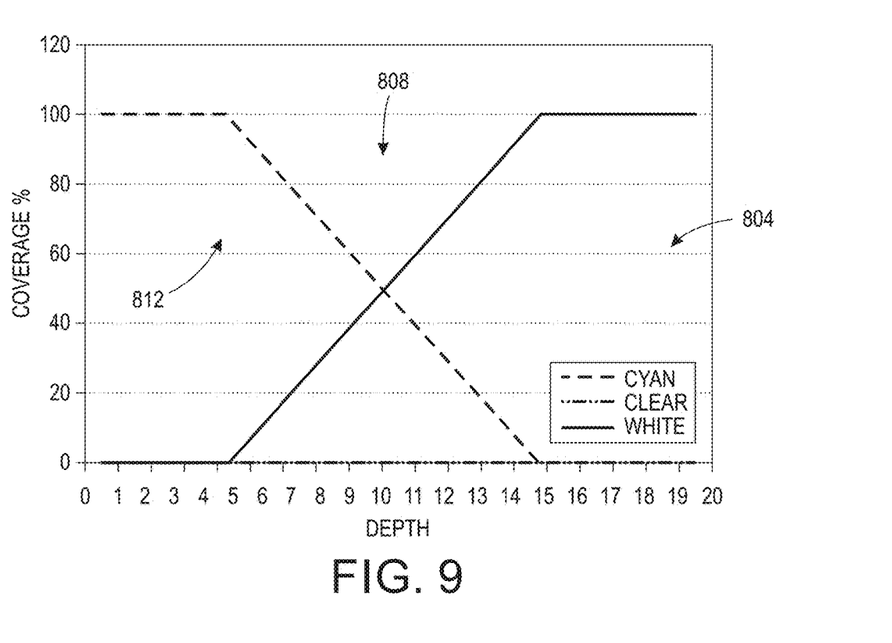
FIG. 9 is a graphical representation of another color rendering strategy that can be performed by the 3D printer of FIG. 1.

In another example shown in FIG. 8, a portion of the color rendering strategy as a function of depth from the surface includes the addition of white material into all colors, even those that are initially at the surface equal to 100%. As portrayed in this figure, the interior of the object is formed with only white material in the region 704 of the graph. At some predetermined distance from the surface in region 708, layers are formed with a linearly increasing amount of pigmented material until the percentage of the pigmented material reaches 50% and with a linearly decreasing amount of white material until the percentage of white material reaches 50%. In a transition region 712, the pigmented material continues to form 50% of the layers, while the white material decreases linearly from 50% to 0% and the clear material increase linearly from 0% to 50%. Near the surface in region 716, the layers are formed with 50% pigmented material and 50% clear material. The rule in this scheme is that at some predetermined depth a layer begins to be formed with pigmented material. White is replaced first and then the color remains a constant while white material decreases in each layer and clear material increases in each layer. FIG. 8 shows this strategy for a 50% coverage of a pigmented material, while FIG. 9 shows the strategy for a 100% coverage of the pigmented material. The graph in FIG. 9 has only three regions, namely, a white material only region 804, a transition region 808, and a pigmented only region 812. In the transition region 808, the white material percentage of the layers decreases linearly to 0%, while the pigmented material of the layers increases linearly to 100% from 0%. In this portion of the strategy, only white and pigmented materials are used.

The strategy described above for using color, white, and clear material drops includes functions for the use of each material as a function of depth from the surface of an object to achieve a desired color level. Generally, more white material drops than pigmented material drops are used in layers located at greater depths from the surface until a depth is reached at which no pigmented material drops are used in favor of white. Additionally, clear drops are used preferentially instead of white drops in layers located nearer to the surface when the amount of pigmented material drops used is lower than the volume of material needed to fill the object. In this strategy, the saturation level of the color that a manufacturer wants a viewer of the object to perceive affects the strategy. The functions defining these transitions can be expressed as polynomials or exponential functions in addition to the linear functions shown in FIGS. 6-10. If higher saturation color levels are required, then more color material drops in layers near the surface are required. Similarly, if lower saturation color levels are desired, then more clear, and possibly white, material drops are used in layers closer to the surface. Thus, the functions are determined by the color, the desired saturation level for the color, and the depth of each layer from the surface. A proposed function is used to form an object and the color of the object is evaluated to determine that the produced color achieves the desired saturation level for the color. Once a function is defined that achieves this goal, a subsequent color calibration is performed to identify a mapping between the desired color at the surface of a 3D part, the fractions of colors used in object layers as a function of distance from the surface of the object, and halftoning is identified to determine the colors of the drops within each voxel prior to printing the object.

The strategies presented above can be expressed in a more general manner as a function of a distance between a voxel and a closest surface of an object. The material drops in each voxel in each layer are expressed as a function of the distance between the voxel and the closest surface, a sum of the average number of material drops at each voxel in each layer of the object, and a target value for the sum of the average number of drops in each voxel of each layer. To obtain a sum S of the average number of material drops at a voxel, the contone values for the colorant materials are added together. Additionally, a target value V is a fixed value proportional to the number of ejectors that must be active at each voxel. The sum S is converted to an actual number of drops for a voxel via a rendering algorithm such as halftoning, error diffusion, or digital binary search algorithms. The conversion from the initial color space and the mapping that includes white and clear colors may be combined into a single step.

For a target value of 100% or less of the sum S, an example of how white and clear colorants can be determined is now presented. White can be expressed as a function of the sum $S_0$ and distance D from the closest surface:

$$W = F(S_0, D),$$

where the function F is a monotonically increasing function with a zero or positive second derivative function that can be exponential or polynomic. $S_0$ is an initial average number of material drops for voxels at a distance D from a closest surface. At a predetermined distance where a colorant does not contribute to the color perceived at a surface, only white and clear are used. As used in this document, the term colorant refers to a material having a color hue in the range of red to violet and the color black. The minimum distance from the surface where no pigmented color is used is denoted as $D_f$ and the sum S of the white and clear at this distance from the closest surface and greater is equal to or very close to V. At distances from the surface less than $D_f$, colorant materials are used. At distances greater than a calculated distance $D_0$ white material drops are used. The value $D_0$ can vary depending upon the degree of saturation for the appearance of a non-white or non-clear color at the surface. Thus, $D_0^{max}$ is the maximum value to which $D_0$ can be set and it occurs for saturated colors. For a saturated color, for example:

$$D_0=D_0^{max} \text{ for } S_0>V/2$$

$$D_0=2*(S_0/V)*D_0^{max} \text{ for } S_0<=V/2$$

Then for W:

$W=0$ for $D<=D_0$, where $D$ is the distance of the voxel from the closest surface, and $$W=V*(D-D_0)^2/(D_f-D_0)^2 \text{ for } D_0<D<D_f$$

$$W=V \text{ for } D>=D_f$$

When $W+S_0>V$ then the sum of the pigmented materials, such as CMYK, is reduced by V-W with each color being reduced by the same proportion. At some distance from the closest surface, S is reduced to zero. In cases where W+S is less than V then clear CL is used to make up the difference and can be represented as:

$$CL=V-W-S$$

While the above relationships control the amount of clear CL through the various distances from a closest surface for the voxels, clear can have its own function with respect to distance from a closest surface in the range of 0 to $D_0$. The function for clear should have a negative second derivative at $D_0$. As the distance between a voxel and a surface decreases, the amount of pigmented ink (IB) increases since they contribute more to the surface appearance. One example of a clear function is:

Clear amount $(CL)=(V-S_0-IB)+IB*\{(1-e^{-\alpha D})/\alpha-De^{-\alpha D0}\}/N$ for $D<D_0$, where N is a normalizer to make the range of the function 0 to 1 (i.e. $N=\{(1-e^{-\alpha D0})/\alpha-D_0 e^{-D0}\}$). In cases where both white and clear are used in the voxels, namely where the distance to the closest surface is in the range $D_0 \leq D \leq Df$, the value for clear is determined with reference to the function $CL=V-W-S$, but once the distance to the closest surface is less than $D_0$, the normalized function is used.

The total amount of pigmented area coverage can be modified. At distances from a surface where clear materials are used without any white materials and $CL+S_0<V$, then the sum of pigmented colors, such as CMYK, is increased by (V-C) with each color increased from the initial average number of material drops $S_0$ by the same proportion. That is:

$$S=S_0+IB*(1-\{(1-e^{-\alpha D})/\alpha-De^{-\alpha D0}\}/N)$$

In systems that do not use clear materials, the sum $S_0$ plus white is required to equal V. This requirement simplifies the calculations. For example:

$$W=V-S_0 \text{ for } D<=D_0$$

$$W=V-S_0*(1-(D-D_0)^2/(D_f-D_0)^2) \text{ for } D_0<D<D_f$$

$$W=V \text{ for } D>=D_f$$

For target values V that are greater than 100%, then white (W) alone cannot equal V so clear (CL) is needed. This requirement changes the equations above to include a maximum white amount $W_{max}$ and a maximum clear amount $CL_{max}$, each of which is less than or equal to 100% such that:

$$W_{max}+CL_{max}>=V$$

The distance from the closest surface where white begins to be introduced ($D_0$) is a function of $S_0$ so that $D_0$ goes to zero when S=0. For example:

$$D_0=D_0^{max} \text{ for } S_0>V/4$$

$$D_0=2*(S_0/V)*D_0^{max} \text{ for } S_0<=V/4$$

Then for W:

$$W=0 \text{ for } D<=D_0$$

$$W=W_{max}*(D-D_0)^2/(D_f-D_0)^2 \text{ for } D_0<D<D_f$$

$$W=W_{max} \text{ for } D>=D_f$$

When $W+S_0>V$ then the sum of pigmented materials, such as CMYK, becomes a sum S that is reduced by V-W with each color reduced by the same proportion and at some depth, S is reduced to zero. In cases where W+S is less than V then clear CL is used to make up the difference in the amount of CL=V-W-S.

Another property that can affect the types of material drops in voxels of an object is the time to produce an object. To reduce the time for printing a 3D object, voxels can be formed with more than one drop per voxel. In an object, all voxels need to average roughly the same amount of material. One way to achieve this property is to double the number of ejectors used to print each color. This approach, however, is expensive. To avoid this expense, different ejectors ejecting drops of color, white, and clear materials are used to eject two drops per voxel with each drop being a different color. For example, to make a white voxel, a white material drop and a clear material drop are ejected into the voxel. For four color printing, such as CMYK color printing, a color drop and a clear drop are ejected into voxels to form voxels of the color drop more quickly. A voxel having a secondary color can be printed with two drops, each drop having a different color in a CMYK printer, for example.

Figure 2:
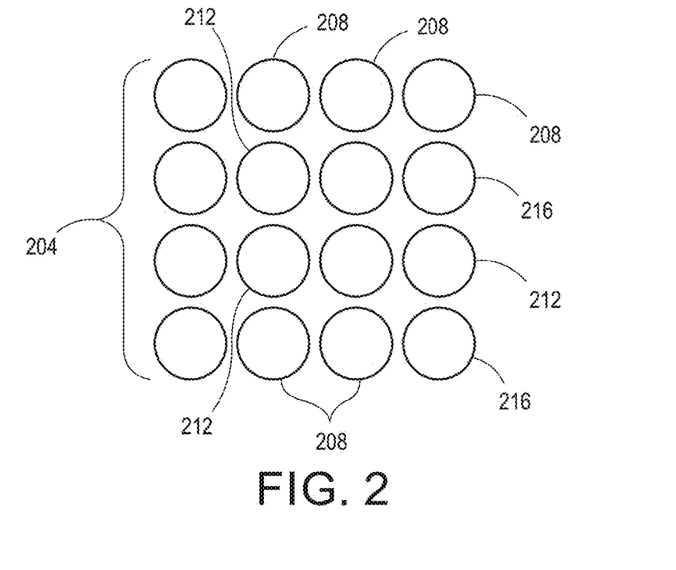
FIG. 2 is an illustration of the drops ejected by the system of FIG. 1.

This method of forming a 3D object more quickly is now discussed with reference to the printer of FIG. 1 and FIG. 2. For example, the controller 46 of FIG. 1 can operate the printer 100 to eject two drops of material 204 in each voxel in single pass rather than ejecting the two drops into the voxel during two passes. Specifically, as the controller 46 operates one or more actuators 42 to move the ejectors in the process direction P, the controller operates one ejector to eject drops of material 204 on top of drops of support material 204 ejected by the other ejector. As shown in FIG. 2, the lowest drop 204 is from ejector 22 and the next highest drop is from ejector 76. When the path of the ejectors is reversed, the next highest drop is ejected by ejector 76 and ejector 22 ejects a drop 204 on top of the drop ejected by ejector 76. In previously known 3D printers, a single ejector, such as ejector 22, ejects a continuous line of drops as the ejector is moved in one direction and then the ejector ejects a continuous line of drops on the first line of drops as the ejector is moved in the reverse direction. This type of operation requires two passes to form two lines, while the inclusion of the second ejector 76 enables two lines to be formed in a single pass.

In a similar manner, the controller 46 also operates the ejectors 68 and 72 to form continuous lines of clear and white materials ejected by these ejectors. Specifically, the controller 46 operates the ejector 68 to eject drops of clear material as the ejectors move in the process direction P and as the ejector 72 passes over the clear drop, the controller operates the ejector 72 to eject a white drop on the clear drop. When the process direction is reversed, the ejector 72 is operated to eject white drops on top of the previously ejected white drops and when the ejector 68 passes over the line of white drops, the controller operates the ejector 68 to eject clear drops on the line of white drops. Thus, the ejectors 68 and 72 form a white layer on a clear layer in one direction in a single pass and then form a clear layer on a white layer in the reverse direction in a single pass. The white/clear layers are particularly advantageous in the interior of the part 10 since color is not usually an important property of the component in the interior regions. Additionally, this combination forms an appropriate background for the formation of colored regions with the pigmented building material as the component layers near the surface of the part 10.

Also, as shown in FIG. 2, two layers of pigmented material drops 216 are formed with a layer of white material drops 212 over one layer and a layer of clear material drops over the other layer. By substituting the layer of pigmented material drops 216 for either a layer of clear drops or a layer of white drops, color can be gradually introduced into the part 10 as described more fully below. Additionally, a line of pigmented drops can be formed partially with pigmented drops and partially with either white material drops, clear material drops, or both. Similarly, a line of clear or white drops can be formed partially with clear drops and partially with white drops. This partial introduction of other material drops helps make the introduction of color to the part 10 more flexible.

The above-described methods enable a controller to be configured to operate ejectors that ejected different materials having different colors to form voxels in a layer having an average volume of material that is greater than the volume of the largest drop that can be dropped by any of the ejectors. These voxels can be formed with drops of the same material, different materials, or material having different colors. This method of operating the ejectors enables thicker layers to be formed in a single pass since two drops can be ejected into voxels per pass rather than requiring a single drop per voxel in a single pass.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A system comprising:
a first plurality of ejectors configured to eject drops of a first material having a first color;
a second plurality of ejectors configured to eject drops of a second material having a second color, the first color being different than the second color;
a third plurality of ejectors configured to eject drops of a third material having a third color, the third color being different than the second color and the first color;
at least one actuator operatively connected to the first plurality of ejectors, the second plurality of ejectors, and the third plurality of ejectors; and
a controller operatively connected to the at least one actuator, the first plurality of ejectors, the second plurality of ejectors, and the third plurality of ejectors, the controller being configured to:
identify an average number of material drops per voxel for each material in each layer of an object to be manufactured;
convert image data for the object to material drop data for each voxel of each layer to identify a number of material drops for the first material, a number of material drops for the second material, and a number of material drops for the third material in each voxel of each layer, the conversion to the material drop data being performed using a first function of (1) a distance between each voxel in each layer and a closest surface of the object, (2) a sum of the average number of first material drops per voxel in each layer, the average number of second material drops per voxel in each layer, and the average number of third material drops per voxel in each layer, and (3) a target value for the sum of the average number of first material drops, the average number of the second material drops, and the average number of the third material drops per voxel in each layer; and
operate the first plurality of ejectors, the second plurality of ejectors, and the third plurality of ejectors using the converted material drop data to eject a number of drops of the first material, a number of drops of the second material, and a number of drops of the third material identified by the converted material drop data to form the voxels of each layer of the object.

2. The system of claim 1, the controller being further configured to operate the at least one actuator to move the first plurality of ejectors, the second plurality of ejectors, and the third plurality of ejectors to position the pluralities of ejectors for ejecting the numbers of material drops of the first, the second, and the third materials into each voxel of each layer of the object.

3. The system of claim 1 further comprising:
a first reservoir containing a first material that is white and the reservoir is operatively connected to the first plurality of ejectors so the first plurality of ejectors ejects white material drops.

4. The system of claim 3 further comprising:
a second reservoir containing a fourth material that is clear; and
a fourth plurality of ejectors operatively connected to the second reservoir so the fourth plurality of ejectors ejects drops of the fourth material that is clear, which is a different color than the first material, the second material, and the third material.

5. The system of claim 4, the controller being further configured to convert the image data for the object to material drop data for the fourth material using a second function of (1) an average number of fourth material drops for each voxel in each layer of the object, (2) the sum of the average of first, second, and third material drops for each voxel in each layer of the object, and (3) a distance between the layer and a closest surface of the object.

6. The system of claim 5 wherein the second function has a negative second derivative.

7. The system of claim 5 where the second function is a difference between the target value for the sum of the average number of material drops per voxel in each layer for the first material, the second material, the third material, and the fourth material and a sum of the average number of drops per voxel in each layer of the first, second, and third materials.

8. The system of claim 7 where the target value for the sum of the average number of material drops per voxel in each layer for the first material, the second material, the third material, and the fourth material is greater than one.

9. The system of claim 7 wherein an average number of material drops for the second material and the third material per voxel in each layer is increased from an initial average number of material drops at distances from a surface for which the output of the first function is zero for the first material.

10. The system of claim 1 further comprising:
a fourth plurality of ejectors configured to eject drops of a fourth material having a magenta color;
a fifth plurality of ejectors configured to eject drops of a fifth material having a black color; and wherein the second color is cyan, and the third color is yellow; and
the sum of the average number of second material drops per voxel in each layer and the average number of third material drops per voxel in each layer includes the average number of fourth material drops per voxel in each layer and the average number of fifth material drops per voxel in each layer.

11. The system of claim 1 wherein the first function monotonically increases the average number of first material drops per voxel in each layer of the object as the distance between the layer and a surface of the object increases.

12. The system of claim 1 wherein the first function has a positive or zero second derivative.

13. The system of claim 4 wherein the material drop data per voxel in each layer at a predetermined distance from a closest surface or greater corresponds to white material drops and clear material drops only.

14. The system of claim 13 wherein the clear material drop data per voxel in each layer less than the predetermined distance from the closest surface increases and the white material drop data for layers less than the predetermined distance from the closest surface decreases.

* * * * *